US012688095B2

(12) United States Patent
Abbigeri et al.

(10) Patent No.: US 12,688,095 B2
(45) Date of Patent: Jul. 21, 2026

(54) PERFORMING MULTI-STREAM PARALLEL INCREMENTAL MERGE BACKUPS FOR CLUSTERED DATABASES

(71) Applicant: Dell Products L.P., Round Rock, TX (US)

(72) Inventors: Shivaraj Abbigeri, Navalgund (IN); Haritha Kora, Kadapa (IN); Rejith Mohan M, Thiruvananthapuram (IN); Navneet Upadhyay, Bangalore (IN); Elango Chockalingam, Bangalore (IN); Vibhanshu Rai, Azamgarh (IN)

(73) Assignee: Dell Products L.P., Round Rock, TX (US)

( * ) Notice: Subject to any disclaimer, the term of this patent is extended or adjusted under 35 U.S.C. 154(b) by 13 days.

(21) Appl. No.: 18/925,519

(22) Filed: Oct. 24, 2024

(65) Prior Publication Data

US 2026/0119325 A1     Apr. 30, 2026

(51) Int. Cl.
*G06F 11/1446*          (2026.01)

(52) U.S. Cl.
CPC ...... *G06F 11/1451* (2013.01); *G06F 11/1464* (2013.01); *G06F 2201/80* (2013.01)

(58) Field of Classification Search
CPC ............. G06F 11/0793; G06F 11/1451; G06F 11/1464; G06F 2201/80
See application file for complete search history.

(56) References Cited

U.S. PATENT DOCUMENTS

| | | | | |
|---|---|---|---|---|
| 8,195,612 B1 * | 6/2012 | Nagarkar | ............ | G06F 11/1451 |
| | | | | 707/650 |
| 9,250,824 B2 * | 2/2016 | Qin | ......................... | G06F 11/00 |
| 11,042,503 B1 * | 6/2021 | Vig | ..................... | G06F 11/1451 |
| 2016/0042090 A1 * | 2/2016 | Mitkar | ................ | G06F 11/1448 |
| | | | | 707/649 |
| 2024/0248814 A1 * | 7/2024 | Marri | .................. | G06F 11/1451 |

* cited by examiner

*Primary Examiner* — Joseph R Kudirka
(74) *Attorney, Agent, or Firm* — Chamberlain, Hrdlicka, White, Williams & Aughtry; Aly Z. Dossa

(57) ABSTRACT

A method for managing data protection operations includes obtaining, by a computing node of the database system and from a data protection system, a data protection request for an incremental merge operation, and in response to obtaining the data protection request: identifying a selection of computing nodes in the database system for performing the data protection operation, initiating, for each computing node in the selection, a mounting operation for mounting a full backup, performing the data protection operation using a subset of the selection that successfully mounted the full backup based on a set of backup streams assigned to each of the subset to perform the incremental merge operation of a database managed by the database system, initiating, after the data protection operation, an unmounting on the subset of the selection.

20 Claims, 8 Drawing Sheets

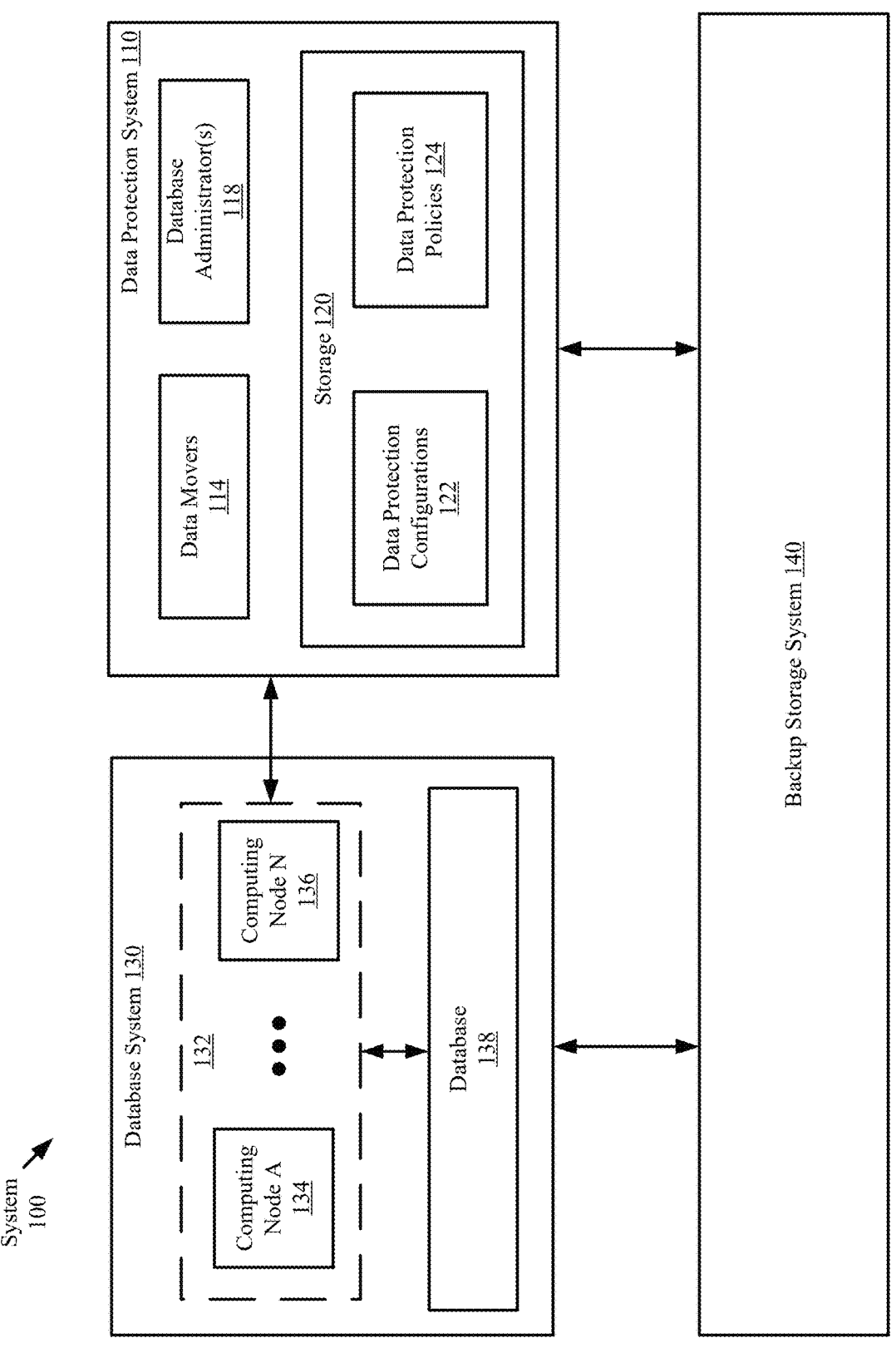
FIG. 1.1

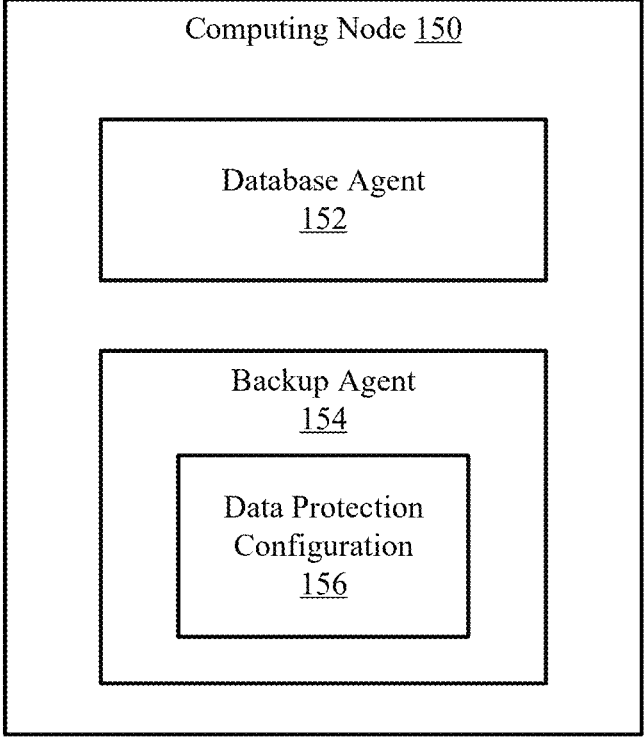
FIG. 1.2

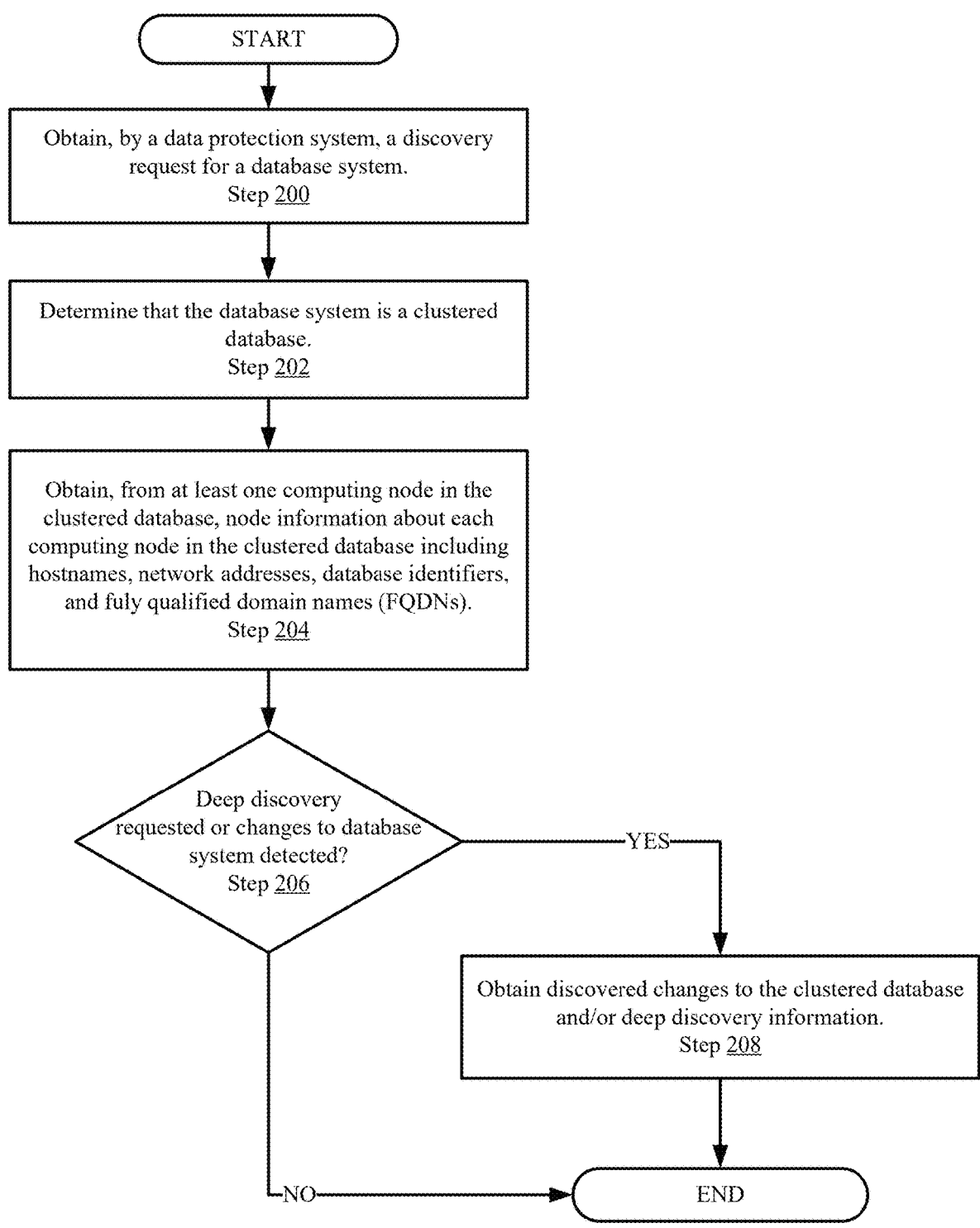
FIG. 2.1

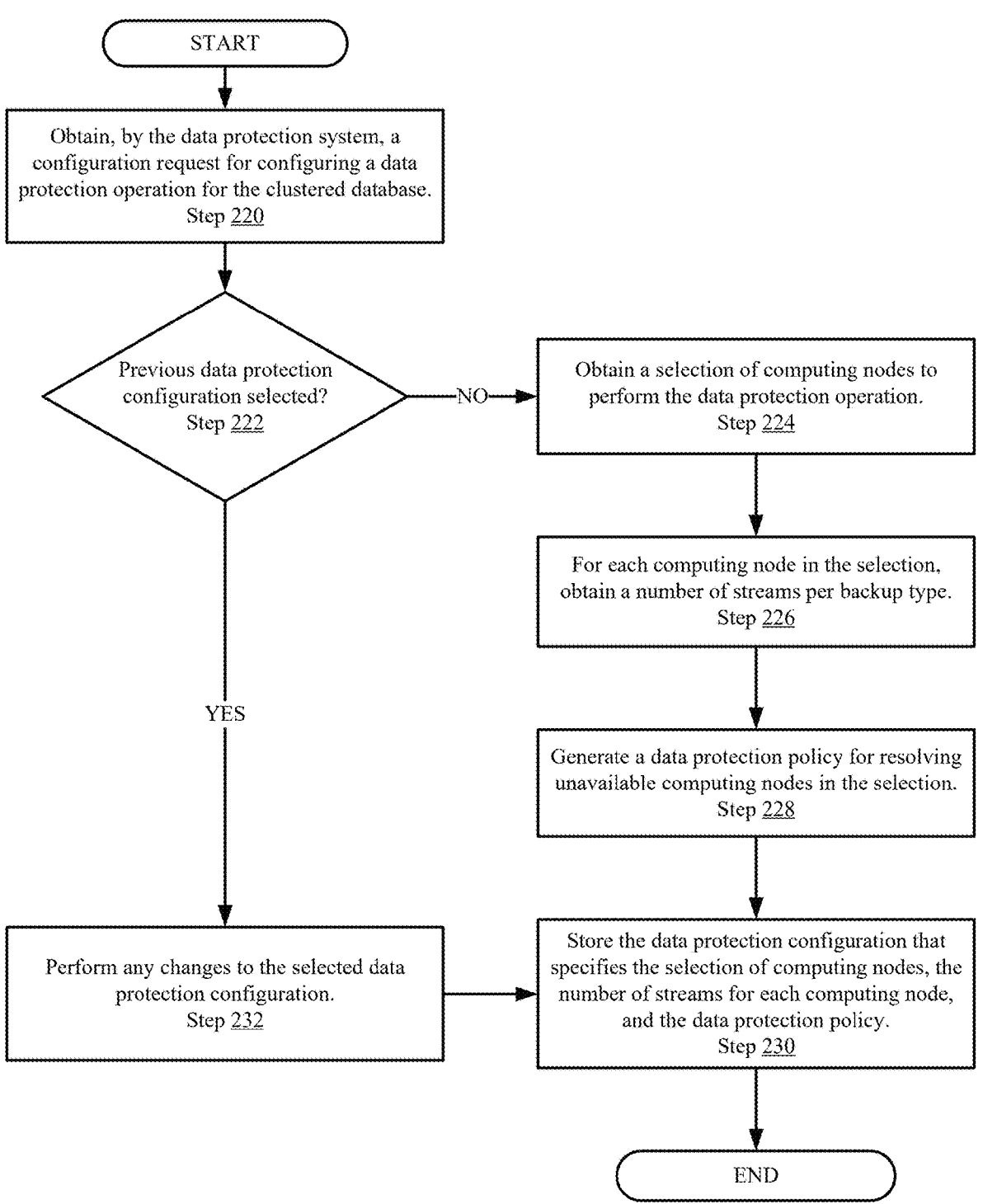
FIG. 2.2

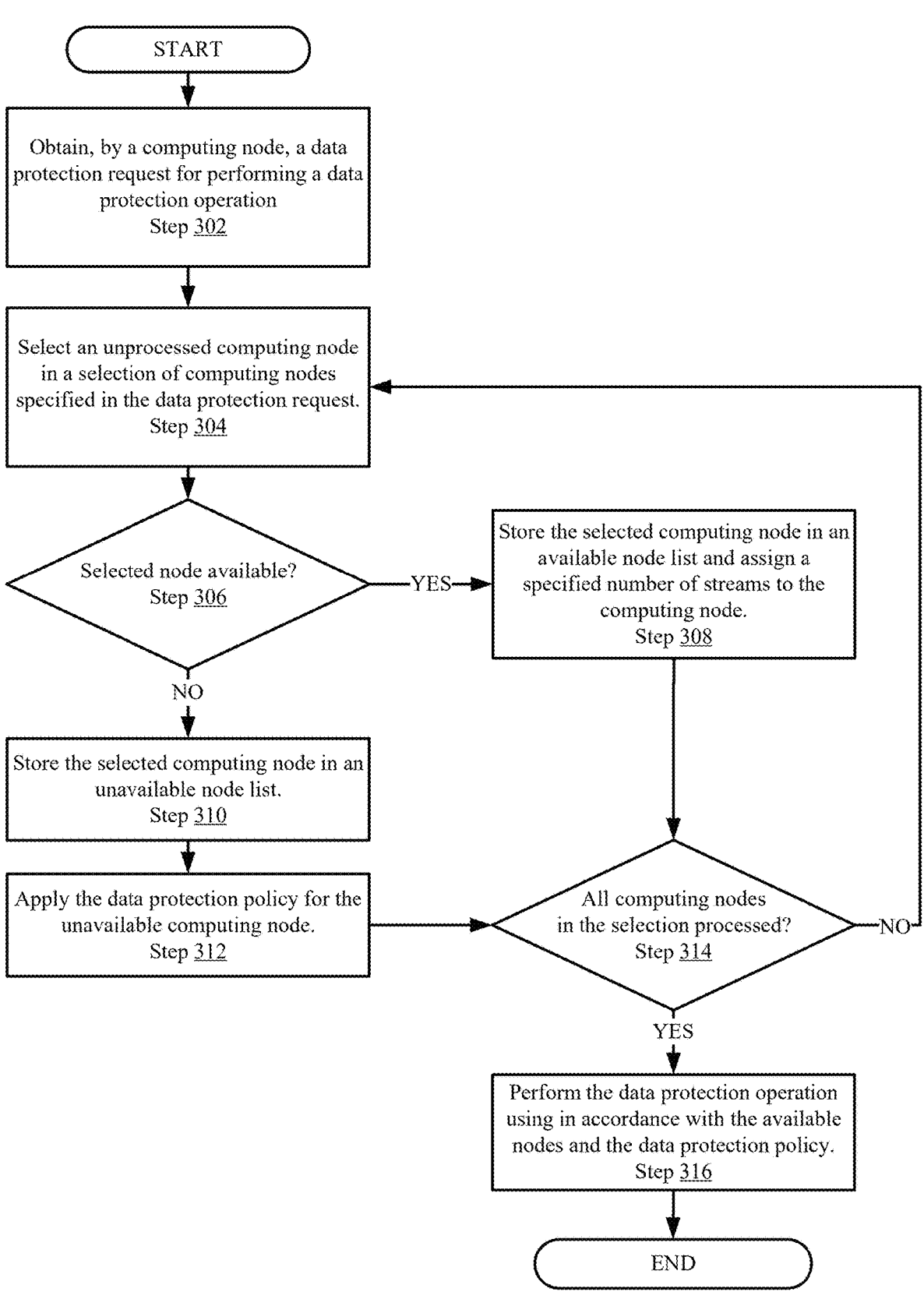
FIG. 3.1

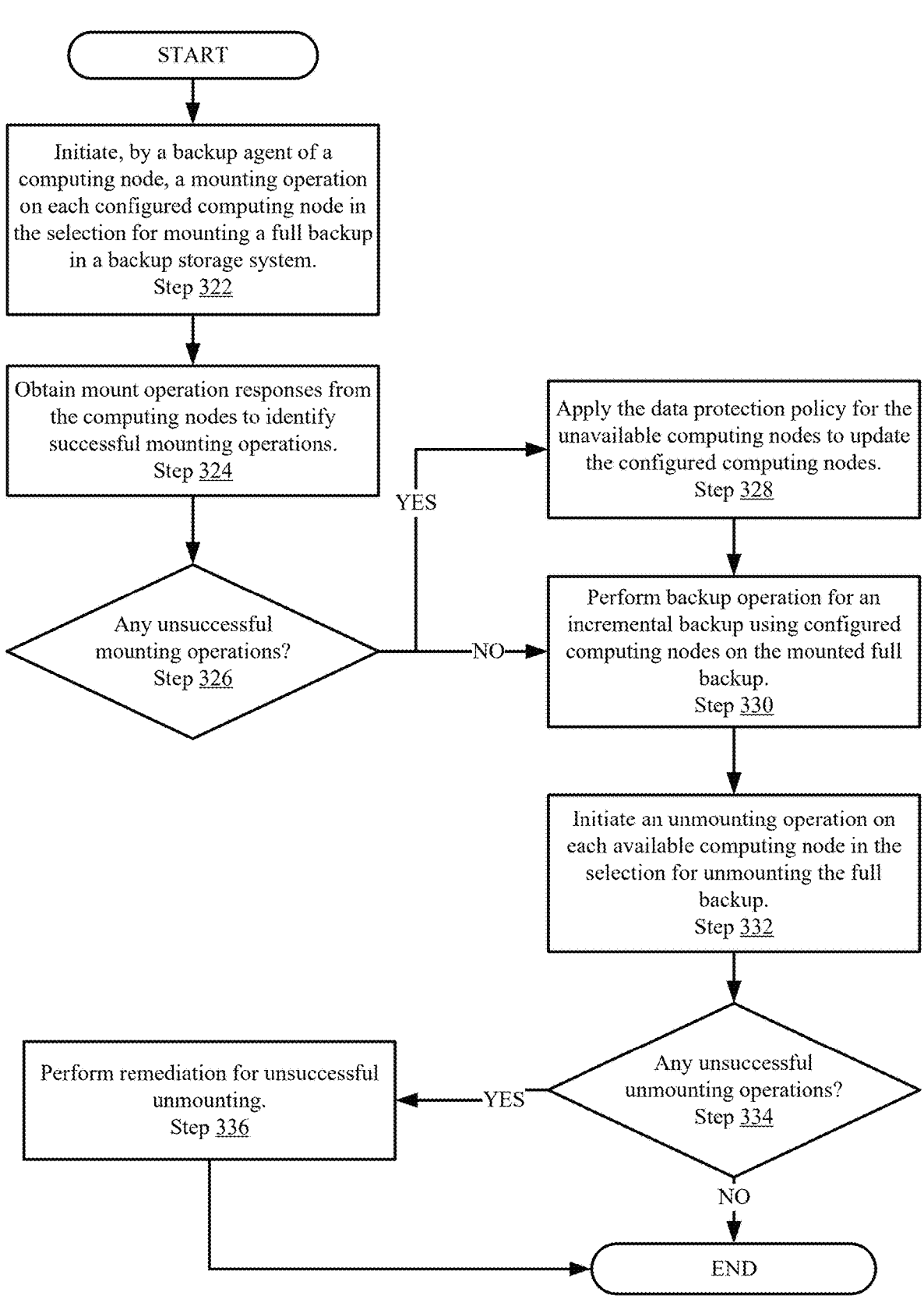
FIG. 3.2

Computer
500

PERFORMING MULTI-STREAM PARALLEL INCREMENTAL MERGE BACKUPS FOR CLUSTERED DATABASES

BACKGROUND

Performing data protection operations on assets such as databases may require use of computing resources of one or more computing devices. The use of limited computing resources may impact other processes performed on the one or more computing devices. For example, storage and processing power used for data protection operations may limit the amount of processing of other tasks by the computing devices.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1.1 shows a diagram of a system in accordance with one or more embodiments of the invention.

FIG. 1.2 shows a diagram of a computing node in accordance with one or more embodiments of the invention.

FIG. 2.1 shows a flowchart of a method for performing a discovery of a database system in accordance with one or more embodiments of the invention.

FIG. 2.2 shows a flowchart of a method for configuring a data protection operation in accordance with one or more embodiments of the invention.

FIG. 3.1 shows a flowchart of a method for performing a configured data protection operation in accordance with one or more embodiments of the invention.

FIG. 3.2 shows a flowchart of a method for performing an incremental merge operation in accordance with one or more embodiments of the invention.

DETAILED DESCRIPTION

Figure 4:
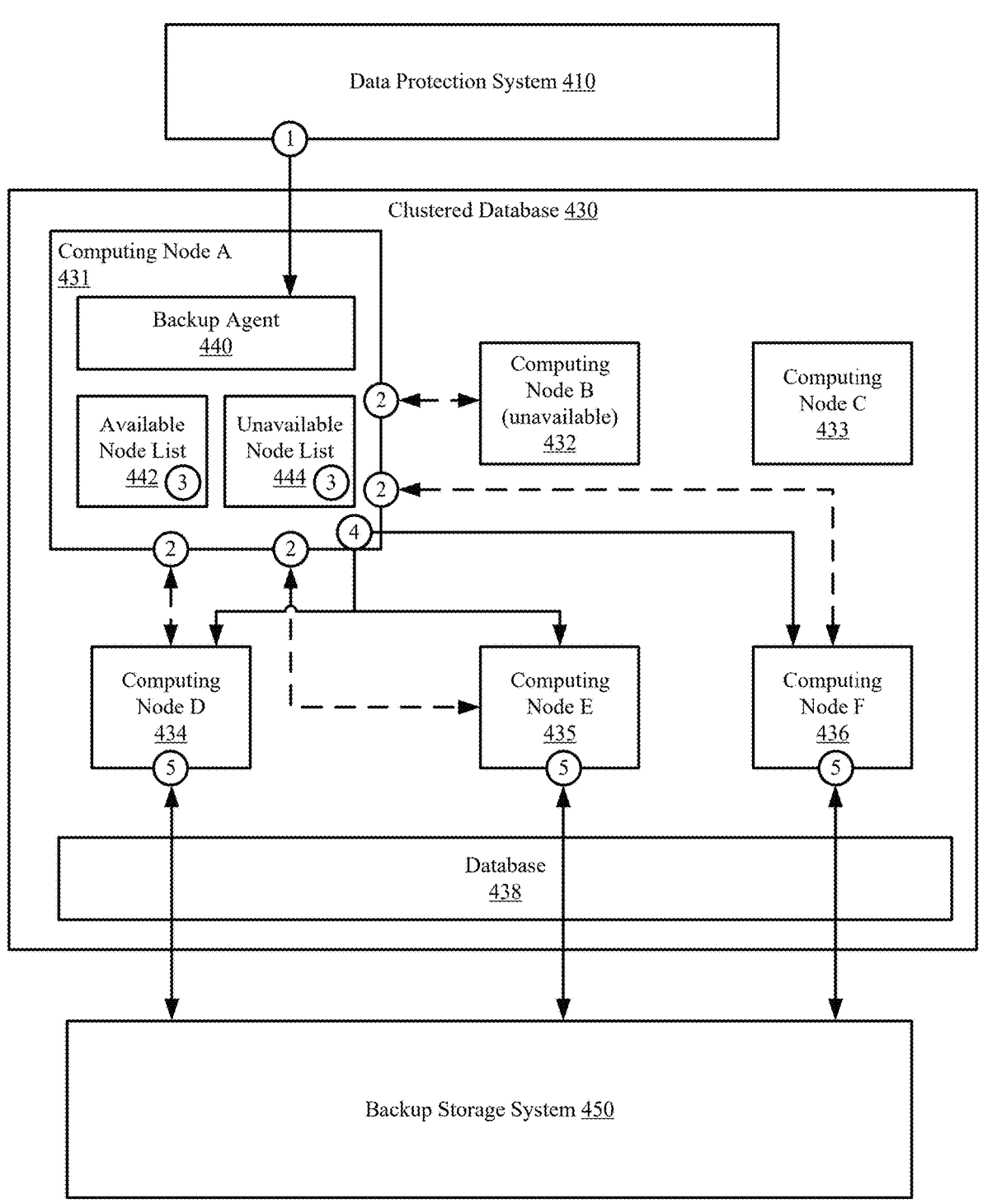
FIG. 4 shows an example in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details, and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this disclosure, elements of figures may be labeled as A to N, A to P, A to M, or A to L. As used herein, the aforementioned labeling means that the element may include any number of items, and does not require that the element include the same number of elements as any other item labeled as A to N, A to P, A to M, or A to L. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

As used herein, the phrase operatively connected, operably connected, or operative connection, means that there exists between elements, components, and/or devices a direct or indirect connection that allows the elements to interact with one another in some way. For example, the phrase 'operably connected' may refer to any direct (e.g., wired directly between two devices or components) or indirect (e.g., wired and/or wireless connections between any number of devices or components connecting the operably connected devices) connection. Thus, any path through which information may travel may be considered an operable connection.

Embodiments disclosed herein include providing the capability and flexibility of a database managed by a cluster of nodes for selecting a subset of the nodes to perform data protection operations. Embodiments of the invention include performing, by a data protection system managing assets, discovery on an asset to determine a type of asset (e.g., a database system) such as a single database or a clustered database. Based on the determined type, embodiments of the invention further include obtaining and storing relevant node information of any computing nodes in the database system. Embodiments of the invention further include performing configuration of data protection operations for a clustered database by selecting a subset of the computing nodes in a database system and determining a data protection policy (discussed below) for unavailable computing nodes. The result is a data protection configuration that the data protection system may issue to at least one computing node for performing the data protection operation. A backup agent of the at least one computing node may apply the data protection configuration using the selected subset (also referred to as a selection of computing nodes). This may result in backing up the database of the database system using the selection of computing nodes.

Embodiments of the invention include functionality for performing incremental backups for backup to tape operations. Embodiments include identifying a selection of computing nodes for servicing the incremental backup, initiating a mounting operation on each of the selection, and, based on the results of the mounting, initiating a data protection operation for the incremental backup using a subset of the selection of computing nodes in which the mounting operation was successful. After the data protection operation is successful, an unmounting operation may be performed on the subset of computing nodes.

Various embodiments of the invention are described below.

FIG. 1.1 shows a diagram of a system in accordance with one or more embodiments of the invention. The system (100) includes a database system (130), a data protection system (110), and a backup storage system (130). The system (100) of FIG. 1.1 may include additional, different, and/or different components without departing from the invention.

In one or more embodiments of the invention, the data protection system (110) includes functionality for performing discovery of assets and initiating data protection operations of the assets. The assets may be, for example, a database system (130), standalone database instances (not shown), and/or other data structures that may be backed up using the data protection system (110). To perform the aforementioned functionality, the data protection system (110) includes data movers, database administrators (114), and storage (120) that includes data protection configurations (122) and data protection policies (124). The data protection system (110) may include additional, fewer, and/or different components without departing from the invention.

Figure 5:
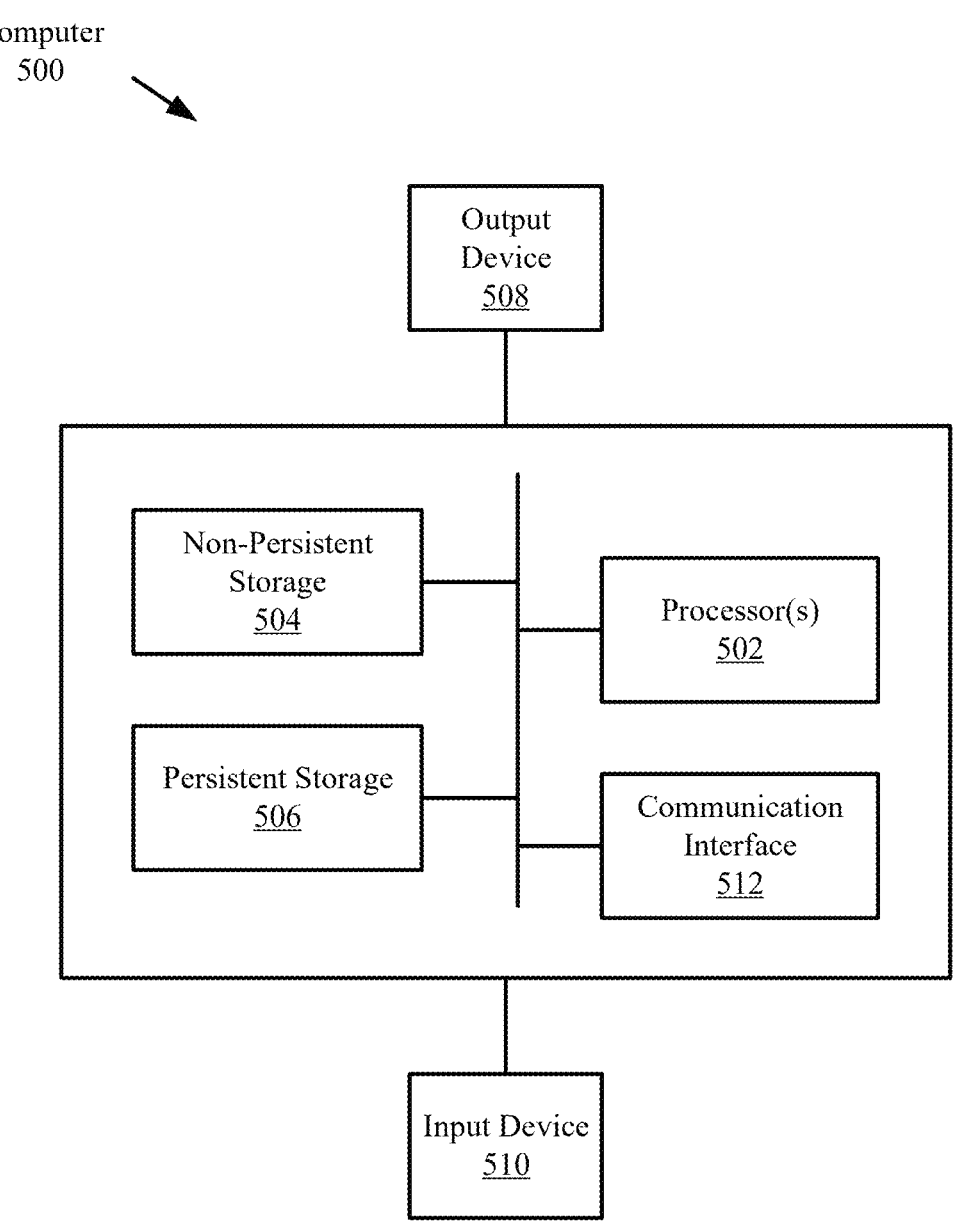
FIG. 5 shows a diagram of a computing device in accordance with one or more embodiments of the invention.

In one or more embodiments disclosed herein, the data protection system (110) is implemented as a computing device (see e.g., FIG. 5). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the data protection system (110) described throughout this application.

In one or more embodiments disclosed herein, the data protection system (110) is implemented as a logical device. The logical device may utilize the computing resources of any number of computing devices and thereby provide the functionality of the data protection system (110) described throughout this application.

In one or more embodiments, the data movers (114) include functionality for transmitting data from the database system (130) to the backup storage system (140). Further, the data movers (114) may include functionality for issuing requests for performing data protection operations, configuring computing nodes (132) with data protection policies (124), and/or transmitting any other data without departing from the invention.

In one or more embodiments, the database administrators (114) include functionality for configuring and designing the data protection configurations (122) and data protection policies (124). The database administrators (114) may communicate with the database system (130) to obtain any relevant information such as node information and use the obtained information to configure data protection operations to generate the data protection configurations (122). The data protection configurations (122) may be generated in accordance with FIG. 2.2.

In one or more embodiments, the database administrators (114) are each implemented as a computing device (see e.g., FIG. 5). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the database administrators (118) described throughout this application.

In one or more embodiments disclosed herein, the database administrators (118) are each implemented as a logical device. The logical device may utilize the computing resources of any number of computing devices and thereby provide the functionality of the database administrators (118) described throughout this application.

In one or more embodiments, the database system (130) is a system of components that generate, store, and/or otherwise modify data in a database (138). The database system (130) may include any number of computing nodes (132) that access the database (138) to perform database management operations such as reading, writing, deleting, or otherwise modifying entries in the database (138). Each computing node (134, 136) may include functionality for performing data protection operations to back up the database (138) to the backup storage system (140). At least one of the computing nodes (134, 136) may include functionality for communicating with the data protection system (110) to initiate data protection operations. Such communication may be performed, for example, in accordance with the method of FIGS. 3.1 and 3.2. An example database system (130) is an Oracle™ Real Application Cluster (RAC).

In one or more embodiments, the computing nodes (132) include heterogeneous capabilities. Said another way, each of the computing nodes (132) may provide varying computing capabilities. For example, a first computing node (133, 136) may include higher computing capabilities relative to a second computing node (136) in the database system (130).

In one or more embodiments, the computing nodes (134, 136) may be located in geographically different locations from each other. For example, a first computing node (134) may be located in an east coast of the United States, and a second computing node (136) may be located in the west coast of the United States. The backup storage system (140) may be geographically located in a near region to one or more of the computing nodes (132).

In one or more embodiments disclosed herein, each computing node (134, 136) is implemented as a computing device (see e.g., FIG. 5). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the computing node (134, 136) described throughout this application.

In one or more embodiments disclosed herein, each computing node (134, 136) is implemented as a logical device. The logical device may utilize the computing resources of any number of computing devices and thereby provide the functionality of the computing node (134, 136) described throughout this application.

For additional details regarding a computing node (134, 136), see, e.g., FIG. 1.2.

While the system (100) is illustrated in FIG. 1.1 as including one database system (130), the data protection system (110) may provide data protection operations for multiple assets such as other database systems. The other database systems may be stand-alone (e.g., managed by one or zero computing node) or clustered databases (e.g., similar to the database system (130) illustrated in FIG. 1.1). Other assets may be protected by the data protection system (110) without departing from the invention.

In one or more embodiments, the backup storage system (140) stores backups of assets in accordance with data protection operations. The backup storage system (140) may include any number of devices (not shown) that each store one or more backups of, for example, the database (138). Each device in the backup storage system (140) may be associated with a network address (e.g., an internet protocol (IP) address). The information corresponding to backups stored in the backup storage system (140) and any storage location information associated with a backup may be managed by the data protection system (110). Said another way, the data protection system (110) may store the information associated with the backups stored in the backup storage system (140) and the corresponding information for accessing each backup. Such information may be used to configure the computing nodes (132) prior to initiating data protection operations.

In one or more embodiments disclosed herein, the backup storage system (140) is implemented as a logical device. The logical device may utilize the computing resources of any number of computing devices and thereby provide the functionality of the backup storage system (140) described throughout this application.

FIG. 1.2 shows a diagram of an example computing node in accordance with one or more embodiments of the invention. The computing node (150) includes a database agent (152) and a backup agent (154). The computing node (150) may include additional, fewer, and/or different components without departing from the invention.

In one or more embodiments of the invention, the database agent (152) includes functionality for accessing the database (138, FIG. 1.1) discussed above and performing operations such as reading, writing, deleting, and copying data in the database. The operations may be initiated by clients accessing the database on behalf of users of an application. The database agent (152) may include any relevant information (e.g., location information) for accessing the database and any data therein.

In one or more embodiments, the backup agent (154) includes functionality for performing data protection operations for data in the database. The backup agent (154) may utilize computing resources of the computing node (150) to perform the data protection operations. An example data protection operation includes copying data (or metadata such as logs) from the database, allocating a number of backup streams for transmitting the copied data to the backup storage system, and performing the transmission using the allocated number of streams. Another example of a data protection operation includes mounting a backup stored in the backup storage system and performing an incremental merge operation to generate incremental backups (or updating full backups) in the backup storage system and, after the incremental merge operation is complete, unmounting the backup to conserve computing resources of the computing node (150). An example backup agent may be an Oracle Recovery Manager (RMAN).

To perform the data protection operations discussed throughout the present disclosure, the backup agent (154) may be configured with a data protection configuration (156). The data protection configuration (156) of a computing node (150) may include information used for accessing the backup storage system (e.g., a computing device or a backup of the backup storage system). For example, the data protection configuration (156) may include IP addresses of the backup storage system Further, the data protection configuration (156) may specify a configuration for a data protection policy (discussed in FIG. 2.2).

In one or more embodiments of the invention, the backup agent further includes a system backup to tape (SBT) component that includes functionality for communicating with other computing nodes (134, 136, FIG. 1.1) in the database system (130, FIG. 1.1) to initiate mounting operations, unmounting operations. To perform such operations, the SBT components may send requests that include parameters such as an operation type (mounting or unmounting), a protocol (e.g., a network file system (NFS) or boost file system (BoostFS)), and a mount path that specifies the path for accessing a backup in the backup storage system.

FIG. 2.1 shows a flowchart of a method for performing a discovery of a database system in accordance with one or more embodiments of the invention. The method shown in FIG. 2.1 may be performed by, for example, a data protection system (110, FIG. 1.1). Other components of the system illustrated in FIG. 1.1 may perform the method of FIG. 2.1 without departing from the invention. While the various steps in the flowchart are presented and described sequentially, one of ordinary skill in the relevant art will appreciate that some or all of the steps may be executed in different orders, may be combined or omitted, and some or all steps may be executed in parallel.

Turning to the method, in step 200, a discovery request is obtained for a database system. In one or more embodiments, the discovery request specifies performing a discovery of the database system to identify components of the database system (e.g., computing nodes, if any) and to obtain node information from the components of the database system.

In step 202, the database system is determined to be a clustered database. In one or more embodiments, the database system is determined to be a clustered database by communicating with at least one computing node in the database system to obtain such determination.

In step 204, node information is obtained about each computing node in the clustered database. In one or more embodiments, the node information includes hostnames of each computing node, network addresses (e.g., IP address) of each computing node, database identifiers of the database in the database system, a fully qualified domain name (FQDN), and any other information associated with the computing nodes and/or the database in the database system. An FQDN refers to a node identifier used by a protocol within the database system to identify each computing node. The node information may be obtained from, for example, one computing node communicating with the data protection system.

In one or more embodiments, the computing node providing the requested node information may include functionality for communicating with the other computing nodes in the clustered database to obtain the node information from the other computing nodes sent to the data protection system.

In step 206, a determination is made about whether a deep discovery is requested or whether changes to the database system are detected. Such determination may be made based on the discovery request. Said another way, the discovery request may specify performing the deep discovery. Further, the deep discovery may be determined based on a schedule for deep discovery performed periodically (e.g., every fifteen minutes). Alternatively, the deep discovery may be performed based on any changes made to the database system as obtained from the node information. Changes may include, for example, addition of a computing node (e.g., via detection of an unrecognized hostname for a computing node in the obtained node information), removal of a computing node, notice of unavailability of a computing node, failure to access the database by the computing nodes, and/or any other changes without departing from the invention. If either a deep discovery is requested or the changes to the database system are detected, the method proceeds to step 208; otherwise, the method ends following step 206.

In step 208, discovered changes are obtained and a deep discovery is performed to obtain deep discovery information. The deep discovery information may include, for example, identifying the added or removed computing nodes, determining whether a computing node has been configured for a data protection operation (discussed below in FIGS. 2.2, 3.1, and 3.2), and any changes to the database that may impact future configurations of the data protection operations.

FIG. 2.2 shows a flowchart of a method for configuring a data protection operation in accordance with one or more embodiments of the invention. The method shown in FIG. 2.2 may be performed by, for example, a data protection system (110, FIG. 1.1). Other components of the system illustrated in FIG. 1.1 may perform the method of FIG. 2.2 without departing from the invention. While the various steps in the flowchart are presented and described sequentially, one of ordinary skill in the relevant art will appreciate that some or all of the steps may be executed in different orders, may be combined or omitted, and some or all steps may be executed in parallel.

In step 220, a configuration request is obtained for configuring a data protection operation for the clustered database. In one or more embodiments, the configuration request specifies determining a selection of computing nodes for performing the data protection operation and a data protection policy for responding to scenarios in which any of the computing nodes in the selection are unavailable for the data protection operation.

In step 222, a determination is made about whether a previous data protection configuration is selected. If a previous data protection configuration is selected, the method proceeds to step 232; otherwise, the method proceeds to step 224.

In step 224, a selection of computing nodes is obtained to perform the data protection operation. In one or more embodiments, the selection of computing nodes are selected by database administrators managing the self-service data protection operations performed by the computing nodes in the database system. The selection may be determined based on other factors such as, for example, current load applied to each computing node, available resources of each computing node, network bandwidth of the computing node to the backup storage system in which backups are to be stored, and/or any other factors without departing from the invention.

In one or more embodiments, the selection of computing nodes to perform the data protection operation may be selected among at least a subset of computing nodes in the database system that have been configured to connect to the backup storage system and access the database to perform backups of the database in accordance with data protection operations initiated by the data protection system.

In step 226, for each computing node in the selection, a number of streams are obtained per backup type of the data protection operation. In one or more embodiments, the database administrators determine a number of streams to be assigned to each of the selected computing nodes.

In one or more embodiments, the database administrators determine a total number of streams to be provided to the data protection operation. Such number may be determined using factors such as, for example, a size of the database being backed up, a type of backup (metadata backup, full backup, incremental backup, incremental merge backup, etc.), a load balancing operation performed on the computing nodes in a clustered database, and computing capabilities of each computing nodes based on obtained relevant node information. The metadata backup may be a backup of metadata associated with the database, and may require less data storage and transmission relative to a full backup.

In one or more embodiments, an incremental merge operation refers to the concept of accessing a full backup stored in the backup storage system (140, FIG. 1.1) discussed above to determine changes made between the full backup and a current state of the database, and storing the changes in the full backup (or separately as an incremental backup). An incremental backup may require less data storage and transmission than a full backup. The incremental merge operation may require the mounting of a full backup to the computing node performing the incremental merge operation. The incremental merge operation further includes allocating channels (e.g., backup streams) to each computing node performing an incremental merge operation of the database. For additional details regarding an incremental merge operation, see, e.g., FIG. 3.2.

In step 228, a data protection policy is generated for resolving unavailable computing nodes in the selection. In one or more embodiments, the data protection policy specifies actions to be taken in the event that one of the computing nodes in the selection is unavailable to perform the data protection operation. Actions may include, for example, redistributing the assigned streams to the unavailable node(s) to the other available nodes, ignoring the assigned streams to the unavailable node(s), and/or any combination thereof. The data protection policy may be generated based on backup configurations optimized by the database administrators.

In step 230, the data protection configuration is stored in the data protection system. The data protection configuration specifies the selection of computing nodes, the number of streams for each computing node in the selection, and the data protection policy.

In step 232, following the determination that a previous data protection configuration is selected, any changes made to the selected data protection configuration are performed. The changes to the data protection configuration may include, for example, modifying the selection of computing nodes for performing the data protection operation, modifying a number of streams for one or more computing nodes in the selection, and modifying the data protection policy for one or more computing nodes in the selection that are deemed unavailable. Other changes may be performed without departing from the invention.

In one or more embodiments, the data protection configuration is used for initiating a data protection operation on the database system. For example, the data protection system may issue a data protection request that specifies the data protection configuration. Other data protection configurations may be specified in the data protection request without departing from the invention. The data protection request may be serviced by a computing node of the database system in accordance with, for example, the method of FIG. 3.1.

FIG. 3.1 shows a flowchart of a method for performing a configured data protection operation in accordance with one or more embodiments of the invention. The method shown in FIG. 3.1 may be performed by, for example, a computing node (132, 134, FIG. 1.1). Other components of the system illustrated in FIG. 1.1 or FIG. 1.2 may perform the method of FIG. 3.1 without departing from the invention. While the various steps in the flowchart are presented and described sequentially, one of ordinary skill in the relevant art will appreciate that some or all of the steps may be executed in different orders, may be combined or omitted, and some or all steps may be executed in parallel.

In step 302, a data protection request is obtained for performing a data protection operation. In one or more embodiments, the data protection request specifies backing up the database of the database system managed by the computing node. The data protection request may specify a data protection configuration generated, for example, in accordance with the method of FIG. 2.2.

In step 304, an unprocessed computing node in a selection of computing nodes is selected for processing.

In step 306, a determination is made about whether the selected computing node is available. The determination may be made by communicating with the selected computing node to obtain confirmation about whether: (i) the selected computing node is accessible by the computing node performing the method of FIG. 3.1, (ii) the selected computing node is capable of accessing the database and the backup storage system, and (iii) the selected computing node has the computing resources (e.g., processing, storage, and network bandwidth) to perform the data protection operation. If the selected computing node meets criteria (i)-(iii), the selected computing node may be deemed available. If the selected node is available, the method proceeds to step 308; otherwise, the method proceeds to step 310.

In step 308, the selected computing node is stored in an available node list and assigned a specified number of streams. The specified number of streams may be the number of streams specified in the data protection operation.

In step 310, following the determination that the selected computing node is not available, the selected computing node is stored in an unavailable node list of the computing node performing the method of FIG. 3.1.

In step 312, the data protection policy is applied for the selected computing node to determine how to re-assign the assigned number of streams. As discussed in FIG. 2.2, the data protection policy may specify actions to perform to manage assigned number of streams for an unavailable computing node. The specified actions may be performed (e.g., ignoring such streams or redistributing among the available streams.

In step 314, a determination is made about whether all computing nodes are processed. If all computing nodes are processed, the method proceeds to step 316; otherwise, the method returns to step 304.

In step 316, the data protection operation is performed in accordance with the available nodes and the data protection policy. In one or more embodiments, the data protection operation includes redistributing, if applicable, the streams from the unavailable nodes to the available nodes, and issuing requests for backing up a portion of the database to each of the available nodes, specifying the number of streams assigned to each available node.

FIG. 3.2 shows a flowchart of a method for performing an incremental merge operation in accordance with one or more embodiments of the invention. The method shown in FIG. 3.2 may be performed by, for example, a computing node (132, 134, FIG. 1.1). Other components of the system illustrated in FIG. 1.1 or FIG. 1.2 may perform the method of FIG. 3.2 without departing from the invention. While the various steps in the flowchart are presented and described sequentially, one of ordinary skill in the relevant art will appreciate that some or all of the steps may be executed in different orders, may be combined or omitted, and some or all steps may be executed in parallel.

In step 322, a mounting operation is performed on each configured computing node in the selection for mounting a full backup in a backup storage system. In one or more embodiments, the mounting operation includes issuing mounting requests to each computing device in a selection of computing nodes (see FIG. 2.2) specified in a data protection policy obtained by the backup agent of the computing node. The mounting operation is initiated in response to a request for performing an incremental merge operation on the full backup stored in the backup storage system to generate an incremental backup.

In step 324, mount operation responses are obtained from the computing nodes to identify successful mounting operations. In one or more embodiments, the mount operation responses each specify whether one of the computing nodes in the selection of computing nodes obtaining the requests for the mount operation were successful in mounting the full backup.

In step 326, a determination is made, using the mount operation responses, about whether any unsuccessful mounting operations are identified. If there are any unsuccessful mounting operations, the method proceeds to step 328; otherwise, the method proceeds to step 330.

In step 328, the data protection policy is applied for the unavailable computing nodes to update the configured computing nodes. The data protection policy may be obtained with the request for the incremental merge operation. The data protection policy may specify ignoring any streams associated with the computing nodes that were unsuccessful at the mounting operation, or it may specify redistributing any assigned backup streams of unsuccessfully mounted computing nodes to other computing nodes that are successful at mounting the full backup.

In step 330, a backup operation is performed for an incremental backup using the configured computing nodes on the mounted full backup. In one or more embodiments, the backup operation includes using any streams assigned to each computing node that successfully mounted the full backup to perform an incremental backup of the database to generate an incremental backup and performing an incremental merge operation to perform the incremental backup.

In step 332, an unmounting operation is initiated on each available computing node in the selection for mounting the full backup. In one or more embodiments, the unmounting operation includes requesting each computing node that performed the backup operation to unmount the full backup from their systems. In this manner, computing resources are preserved for the computing nodes. Further, limits to access to the full backup is limited to the incremental merge operation, reducing risk of undesired (to the data protection system) access to the backup by the computing nodes.

In step 334, a determination is made about whether any unsuccessful unmounting operations are performed. If there are any unsuccessful unmounting operations, the method proceeds to step 336; otherwise, the method ends following step 334.

In step 336, a remediation is performed for unsuccessful unmounting. The remediation may include notifying a database administrator of the data protection system of the failure to unmount.

EXAMPLE

To clarify aspects of the invention, the following describes an example in accordance with one or more embodiments of the invention. The example, described using FIG. 4, is not intended to limit aspects of the invention. In the example, consider a scenario in which hardware components have been purchased by a client and from a vendor. Actions performed by components of FIG. 4 may be represented using circled numbers and described below using brackets (e.g., "[1]").

Turning to the example and to FIG. 4, a data protection system (410) includes functionality for discovering computing nodes in a clustered database (430). The clustered database (430) includes computing nodes A (431), B (432), C (433), D (434), E (435), and F (436) and a database (438). Based on the discovery, the data protection system (410) obtains relevant node information from each computing node (431, 432, 433, 434, 435, 436). Based on the discovery, the data protection system (410) identifies that computing nodes A, D, E (431, 434, 435) include enhanced computing capabilities relative to the other computing nodes (432, 433, 436).

The data protection system (410) implements the method of FIG. 2.2 to configure a data protection operation for backing up the database (438) using a selection of the computing nodes (431, 432, 433, 434, 435, 436). The selection of computing nodes includes computing nodes B, D, E, and F (432, 434, 435, 436). The selection of computing nodes (432, 434, 435, 436) are assigned a number of streams to be used for a multi-stream parallel backup of the database (438) to store the backup in the backup storage system (450). In this example, each computing node is assigned three streams to be used for backing up the database (438), for a total of 12 streams used in parallel for backing up the database (438) across the four computing nodes (432, 434, 435, 436). A data protection policy specifies that, for each computing node (432, 434, 435, 436) that is unavailable for the data protection operation, the assigned streams are redistributed to the available computing nodes in the selection.

Following the configuration of the data protection operation, the data protection system (410) issues a request for data protection operation to be performed by the selection of computing nodes (432, 434, 435, 436). The request is sent to a backup agent (440) of computing node A (431) [1]. The request specifies the selection of computing nodes (432, 434, 435, 436) to perform the data protection operation, the assigned number of streams for each of the selection, and a data protection policy for resolving unavailable computing nodes.

After receiving the request, computing node A (431) performs the method of FIG. 3.1 to communicate with the computing nodes (431, 432, 434, 435, 436) to confirm the availability of the computing nodes (431, 432, 434, 435, 436) in the selection [2]. From the communication, computing node A (431) determines that computing node B (432) is unavailable for the data protection operation. The other three computing nodes (434, 435, 436) are available and configured with the capability to perform the data protection operation. Based on these determinations, the computing node updates an available node list (442) and an unavailable node list (444) with the corresponding available computing nodes (i.e., 434, 435, 436) and unavailable computing node (i.e., 432) [3].

Following the updates to the data structures (442, 444), computing node A (431) applies the data protection policy to distribute the streams assigned to computing node B (432) to the other three available computing nodes (434, 435, 436). Computing node A (431) updates the number of streams assigned to each available computing node (434, 435, 436). As such, each of the available computing nodes (432, 434, 435, 436) in the selection are assigned four streams, maintaining the 12 streams across the three computing nodes (434, 435, 436). Computing node A issues requests for backing up the database (438) using the available selected computing nodes (434, 435, 436) using the updated number of streams [4].

Based on the assigned number of streams, each of the three selected available computing nodes (434, 435, 436) perform the backup of the database (438) to store the backup in the backup storage system (450).

Continuing the example, the data protection system (410) further includes functionality for initiating an incremental merge operation on a full backup of the database (438). To initiate the incremental merge operation, the data protection system (410) configures the incremental merge operation in accordance with FIG. 2.2 to obtain a selection of computing nodes. The selection of computing nodes performing the incremental merge operation may be the same or different from the selection used to perform the data protection operation of FIG. 4. The data protection operation issues a request for performing the incremental merge operation to the backup agent (440) of computing node A (431).

END OF EXAMPLE

As discussed above, embodiments of the invention may be implemented using computing devices. FIG. 5 shows a diagram of a computing device in accordance with one or more embodiments of the invention. The computing device (400) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computer (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention provide methods for backing up large database clusters by communicating with one node to initiate the data protection operation (e.g., a backup). Embodiments of the invention leverage load balancing capabilities of computing nodes in database systems by allocating multiple backup streams to each computing node in a selected subset of the database system, configuring the data protection operation on the data protection system (external to the database system) and initiating the database operation on at least one computing node. The at least one computing node may include the functionality for servicing a configured data protection configuration by distributing the streams among the selected computing nodes and distributing streams among the selected computing nodes in accordance with a data protection policy.

By assigning the responsibility of distribution of backup streams to the computing nodes rather than the data protection system, this intelligent and unique approach increases the reliability and efficiency of the system. Additionally, it has built-in capability to confirm whether each selected computing node is available in the cluster during backup, ensuring efficient allocation of backup streams and graceful handling of any node unavailability during the backup operation, resulting in a high success rate for backups.

Further, database systems may be configured with system backup to tape (SBT) technology for storing full and incremental backups. Data protection operations using SBT may be performed using scripts running in the database systems. With an incremental merge operation of incremental backups, a mounting operation may be required. Embodiments of the invention enable the mounting and unmounting operations to be performed on selected computing nodes in the database system to provide the capabilities to the database system to perform an incremental merge operation. For a database system that provides load balancing capabilities, the load balancing capabilities may not be useful within the database system if such database system does not have the capability to mount or unmount a backup from a backup storage system, the load balancing capabilities are not particularly useful for an incremental merge operation. Embodiments of the invention enable the data protection system to provide such mount and unmount capabilities.

Thus, embodiments of the invention may address the problem of inefficient use of computing resources. This problem arises due to the technological nature of the environment in which file systems are utilized.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for managing data protection operations in a database system, the method comprising:
  obtaining, by a computing node of the database system and from a data protection system, a data protection request for performing a data protection operation, wherein the data protection operation is an incremental merge operation to generate an incremental backup; and
  in response to obtaining the data protection request:
    identifying a selection of computing nodes in the database system for performing the data protection operation;
    initiating, for each computing node in the selection, a mounting operation for mounting a full backup of the incremental backup;
    determining a subset of the selection that successfully mount the full backup;
    applying a data protection policy to assign a set of backup streams to each of the subset of the selection;
    performing the data protection operation using the subset of the selection and the set of backup streams assigned to each of the subset to generate the incremental backup of a database managed by the database system; and
    initiating, after the data protection operation, an unmounting on the subset of the selection.

2. The method of claim 1, further comprising:
  prior to obtaining the data protection request: obtaining, by the data protection system, a configuration request for configuring the data protection operation; and
  in response to the configuration request:
    obtaining the selection of computing nodes;
    for each computing node in the selection, obtaining a second set of backup streams to each of the selection of computing nodes; and
    generating the data protection policy that specifies actions to perform for an unavailable computing node in the selection of computing nodes.

3. The method of claim 2, wherein a data protection configuration comprises the data protection policy, the selection of computing nodes, and the second set of backup streams, and wherein the data protection request comprises the data protection configuration.

4. The method of claim 2, wherein the data protection policy comprises at least one of: ignoring a first set of backup streams of the unavailable computing node, and redistributing the first set of backup streams among the subset of the selection.

5. The method of claim 1, further comprising:
  prior to obtaining the data protection request: obtaining, by the data protection system, a discovery request for discovering the database system; and
  in response to the discovery request:
    determining that the database system is a clustered database comprising a plurality of computing nodes; and obtaining, from each computing node in the plurality of computing nodes, node information comprising a hostname, a network address, and a fully qualified domain name (FQDN).

6. The method of claim 1, further comprising:

after initiating the unmounting, obtaining a response from one of the subset of the selection that indicates unsuccessful unmounting; and in response to the response, performing a remediation for the unsuccessful unmounting.

7. The method of claim 6, wherein the remediation comprises notifying a database administrator of the unsuccessful unmounting and specifying performing a manual unmounting.

8. A non-transitory computer readable medium comprising computer readable program code, which when executed by a computer processor enables the computer processor to perform a method for managing data protection operations in a database system, the method comprising:

obtaining, by a computing node of the database system and from a data protection system, a data protection request for performing a data protection operation, wherein the data protection operation is an incremental merge operation to generate an incremental backup; and in response to obtaining the data protection request:

identifying a selection of computing nodes in the database system for performing the data protection operation;

initiating, for each computing node in the selection, a mounting operation for mounting a full backup of the incremental backup;

determining a subset of the selection that successfully mount the full backup;

applying a data protection policy to assign a set of backup streams to each of the subset of the selection;

performing the data protection operation using the subset of the selection and the set of backup streams assigned to each of the subset to generate the incremental backup of a database managed by the database system; and initiating, after the data protection operation, an unmounting on the subset of the selection.

9. The non-transitory computer readable medium of claim 8, the method further comprising:

prior to obtaining the data protection request: obtaining, by the data protection system, a configuration request for configuring the data protection operation; and in response to the configuration request:

obtaining the selection of computing nodes;

for each computing node in the selection, obtaining a second set of backup streams to each of the selection of computing nodes; and generating the data protection policy that specifies actions to perform for an unavailable computing node in the selection of computing nodes.

10. The non-transitory computer readable medium of claim 9, wherein a data protection configuration comprises the data protection policy, the selection of computing nodes, and the second set of backup streams, and wherein the data protection request comprises the data protection configuration.

11. The non-transitory computer readable medium of claim 9, wherein the data protection policy comprises at least one of: ignoring a first set of backup streams of the unavailable computing node, and redistributing the first set of backup streams among the subset of the selection.

12. The non-transitory computer readable medium of claim 8, the method further comprising:

prior to obtaining the data protection request: obtaining, by the data protection system, a discovery request for discovering the database system; and in response to the discovery request:

determining that the database system is a clustered database comprising a plurality of computing nodes; and obtaining, from each computing node in the plurality of computing nodes, node information comprising a hostname, a network address, and a fully qualified domain name (FQDN).

13. The non-transitory computer readable medium of claim 8, the method further comprising:

after initiating the unmounting, obtaining a response from one of the subset of the selection that indicates unsuccessful unmounting; and in response to the response, performing a remediation for the unsuccessful unmounting.

14. The non-transitory computer readable medium of claim 13, wherein the remediation comprises notifying a database administrator of the unsuccessful unmounting and specifying performing a manual unmounting.

15. A system, comprising:

a data protection system;

a database system comprising a plurality of computing nodes, wherein a computing node of the plurality of computing nodes comprises a processor; and memory comprising instructions, which when executed by the processor, cause the processor to perform a method, the method comprising:

obtaining, from the data protection system, a data protection request for performing a data protection operation, wherein the data protection operation is an incremental merge operation to generate an incremental backup; and in response to obtaining the data protection request:

identifying a selection of computing nodes in the database system for performing the data protection operation;

initiating, for each computing node in the selection, a mounting operation for mounting a full backup of the incremental backup;

determining a subset of the selection that successfully mount the full backup;

applying a data protection policy to assign a set of backup streams to each of the subset of the selection;

performing the data protection operation using the subset of the selection and the set of backup streams assigned to each of the subset to generate the incremental backup of a database managed by the database system; and initiating, after the data protection operation, an unmounting on the subset of the selection.

16. The system of claim 15, the method further comprising:

prior to obtaining the data protection request: obtaining, by the data protection system, a configuration request for configuring the data protection operation; and in response to the configuration request:

obtaining the selection of computing nodes;

for each computing node in the selection, obtaining a second set of backup streams to each of the selection of computing nodes; and generating the data protection policy that specifies actions to perform for an unavailable computing node in the selection of computing nodes.

17. The system of claim 16, wherein a data protection configuration comprises the data protection policy, the selection of computing nodes, and the second set of backup streams, and wherein the data protection request comprises the data protection configuration.

18. The system of claim 16, wherein the data protection policy comprises at least one of: ignoring a first set of backup streams of the unavailable computing node, and redistributing the first set of backup streams among the subset of the selection.

19. The system of claim 15, the method further comprising:

after initiating the unmounting, obtaining a response from one of the subset of the selection that indicates unsuccessful unmounting; and in response to the response, performing a remediation for the unsuccessful unmounting.

20. The system of claim 19, wherein the remediation comprises notifying a database administrator of the unsuccessful unmounting and specifying performing a manual unmounting.

\* \* \* \* \*